United States Patent
Alldread et al.

(10) Patent No.: US 6,351,768 B1
(45) Date of Patent: *Feb. 26, 2002

(54) PERFORMANCE MONITOR FOR LEASED TRANSMISSION FACILITIES

(75) Inventors: Raymond E. Alldread, Conyers, GA (US); William T. Murphy, Easton, PA (US); Luiz A. Vitoria, Bridgewater, NJ (US); Terry Watkins, Conyers, GA (US); Joseph Wittmann, Katonah, NY (US)

(73) Assignee: AT&T Corp, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/994,607

(22) Filed: Dec. 19, 1997

(51) Int. Cl.[7] .................. G06F 15/173; G06F 15/16
(52) U.S. Cl. ............................ 709/224; 709/249
(58) Field of Search ................. 709/223, 224, 709/236, 237, 238, 249; 714/39, 47, 31, 57; 370/450, 454, 456, 459, 528

(56) References Cited

U.S. PATENT DOCUMENTS

| | | | |
|---|---|---|---|
| 4,149,038 A | * 4/1979 | Pitroda et al. | 370/244 |
| 4,622,664 A | * 11/1986 | Itoh et al. | 370/222 |
| 5,018,184 A | * 5/1991 | Abrams et al. | 379/29 |
| 5,233,600 A | * 8/1993 | Pekarske | 370/228 |
| 5,307,340 A | * 4/1994 | Inoue et al. | 370/245 |
| 5,363,493 A | * 11/1994 | Unverrich | 709/224 |
| 5,375,159 A | * 12/1994 | Williams | 379/23 |
| 5,491,686 A | * 2/1996 | Sato | 370/223 |
| 5,546,540 A | * 8/1996 | White | 709/224 |
| 5,636,203 A | * 6/1997 | Shah | 370/244 |
| 5,651,061 A | * 7/1997 | Domoto et al. | 379/220 |
| 5,689,546 A | * 11/1997 | Sheets et al. | 379/34 |
| 5,721,726 A | * 2/1998 | Kurnick et al. | 370/236 |
| 5,764,920 A | * 6/1998 | Cook et al. | 709/238 |
| 5,774,669 A | * 6/1998 | George et al. | 709/224 |
| 5,796,723 A | * 8/1998 | Bencheck et al. | 370/252 |
| 5,818,904 A | * 10/1998 | Dean | 379/22 |
| 5,819,028 A | * 10/1998 | Manghirmalani et al. | 709/224 |
| 5,832,503 A | * 11/1998 | Malik et al. | 707/104 |
| 5,838,750 A | * 11/1998 | Rynaski et al. | 709/236 |
| 5,854,835 A | * 12/1998 | Montgomery et al. | |
| 5,867,558 A | * 2/1999 | Swanson | 379/34 |
| 5,937,035 A | * 8/1999 | Andruska et al. | 379/34 |
| 5,943,314 A | * 8/1999 | Croslin | 370/216 |
| 5,956,324 A | * 9/1999 | Engdahl et al. | 370/242 |
| 5,978,113 A | * 11/1999 | Kight | 359/110 |
| 6,031,906 A | * 2/2000 | Rao | 379/273 |
| 6,125,104 A | * 9/2000 | Shiragaki et al. | 370/216 |
| 6,130,876 A | * 10/2000 | Chaudhuri | 370/228 |

OTHER PUBLICATIONS

Anonymous, "Network–to–Customer—DS3 Metallic Interface Specification", ANSI T1.404–1996, Section 7.1.1, p. 5, 1996.*

"DS3 Path Monitor (DS3PM) Operations & Maintenance Manual," AT & T International Corke Abbey, Bray County Dublin, Ireland, Apr. 6, 1989.

* cited by examiner

Primary Examiner—Mark H. Rinehart
Assistant Examiner—Marc D. Thompson
(74) Attorney, Agent, or Firm—Kenyon & Kenyon

(57) ABSTRACT

Method and apparatus that verifies integrity of communications facilities leased from another network. An idle signal is routed to the lessor network at a first point of interface and should be returned from the lessor network at a second point of interface. If the idle signal is not returned, it indicates a failure of integrity in the leased transmission facilities. If the idle signal is not returned, the type of signal that is returned may indicate a type of error that has occurred, such as equipment failure or allocation of the facility for a different purpose.

12 Claims, 5 Drawing Sheets

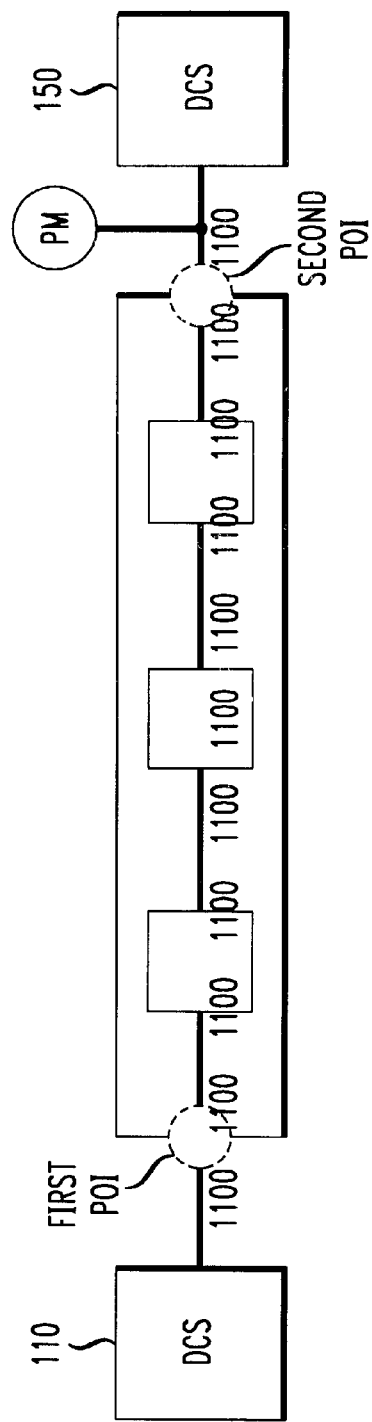
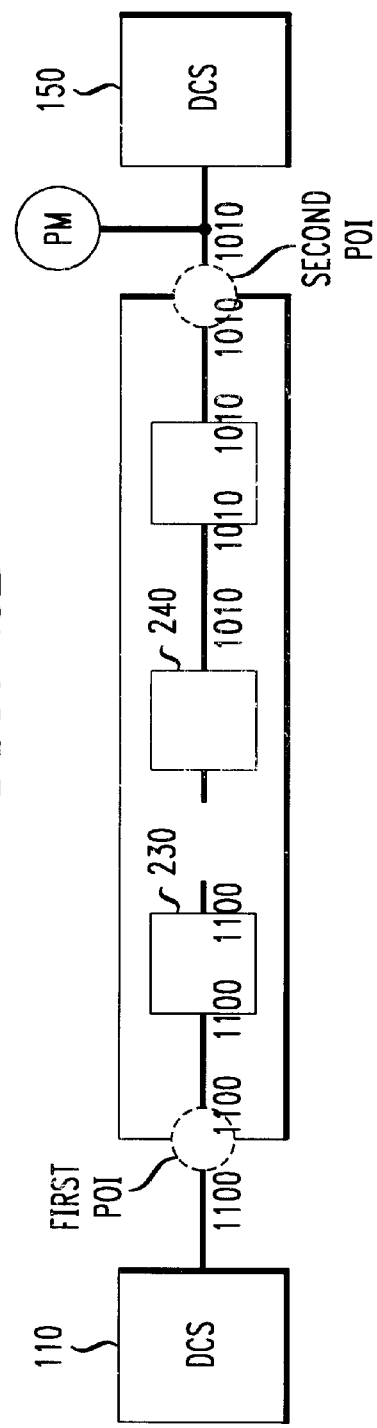

PERFORMANCE MONITOR FOR LEASED TRANSMISSION FACILITIES

BACKGROUND OF THE INVENTION

The present invention relates to communications systems and, more particularly, to a method and apparatus for monitoring integrity of leased transmission facilities in communications systems.

One way that telecommunication service providers compete with one another in the marketplace is through service quality. Service providers take elaborate steps to ensure that their telecommunications equipment provides constant, uninterrupted service. When equipment fails, the communication network quickly engages other equipment to ensure that communication traffic continues to be routed to its destination. Telecommunications service providers often offer minimum outage guarantees in which they guarantee to respond to equipment failure by restoring service within a minimum period of time. The period does not allow for manual diagnostic and cure. For example, such guarantees may specify that equipment failures are diagnosed and cured within two minutes.

To meet such minimum guarantees, the telecommunication service provider may provide a diagnostic processor within its communication network to monitor the status of network components. The diagnostic processor maintains a communication link with each and every component in the system to perform its monitoring function. When errors occur, the diagnostic processor identifies the failing hardware and reconfigures the remainder of the operable hardware to circumvent the failed component. Ideally, in this manner, the diagnostic processor reroutes calls within the network to prevent lost data and restore service to customers. Within the network, certain network resources that previously may have been idle are activated to replace network resources that failed. Such a method is currently in use in the FASTAR® system operated by AT&T, the assignee of the present invention.

To reroute calls within the necessary time-frame, the diagnostic processor must know that the equipment that previously was idle is operating properly. Accordingly, the diagnostic processor extends its monitoring function to idle and active network components equally.

As the demand for telecommunications service has grown, more and more telecommunications service providers are leasing capacity from other service providers. The leased capacity may be used to carry communication traffic. Alternatively, however, the leased capacity is used as a backup; it is held in reserve and allocated for use when equipment failures cause other capacity to become unavailable.

Among service providers, leasing arrangements rarely obligate a lessor service provider to dedicate specific communication equipment within its network for the use of its lessee. Instead, the lessor service provider becomes obligated only to accept a predetermined amount of data from the lessee at a first point of interface ("POI") and route the data from the first to a second POI. The lessor service provider is left to its own discretion to determine how the calls shall be routed through its network. In practice, the lessor's network establishes communication pathways between the POIs that are convoluted; they also change over time.

In a leased capacity configuration, the lessee's diagnostic processor possesses no communication links with the equipment of the lessor's network. Accordingly, in an emergency, the diagnostic processor cannot determine whether the communication path established by the lessor network is properly made or whether the lessor's equipment is operating. Failures within the lessor network cannot be detected. Therefore, although leased capacity may serve as a backup resource, uncertainty as to its availability may cause the leasing network to default in its obligations to guarantee minimum outage times to its customers.

Leased capacity also suffers an additional disadvantage in that a proprietor of the leasing network may fail to provide the capacity that it is obligated to provide. In such a case, the lessor network may use the capacity for its own purposes even though the lessor is obligated to provide the capacity to the lessee. In such a case, no communication pathway is established between the POIs. If the lessee network routed data to the lessor network, the data would be lost.

Accordingly, there is a need in the art for a diagnostic tool in communication networks that confirms the integrity of communication pathways established in facilities leased from another communication network. Further, there is a need in the art for such a tool that confirms such pathways without direct communication with the equipment that establishes the pathways.

SUMMARY OF THE INVENTION

The disadvantages of the prior art are alleviated to a great degree by a method and apparatus that verifies the integrity of communications facilities leased from another network. The present invention monitors an idle signal that is routed to the lessor network at first point of interface and should be returned from the lessor network at a second point of interface. If the idle signal is not returned, it indicates a failure of integrity in the leased transmission facilities. If the idle signal is not returned, the type of signal that is returned may indicate a type of error that has occurred, such as equipment failure or allocation of the facility for a different purpose.

BRIEF DESCRIPTION OF THE DRAWINGS

FIGS. 2(a) through 2(d) illustrate various signal paths that may be taken by the lessor network.

DETAILED DESCRIPTION

Figure 1:
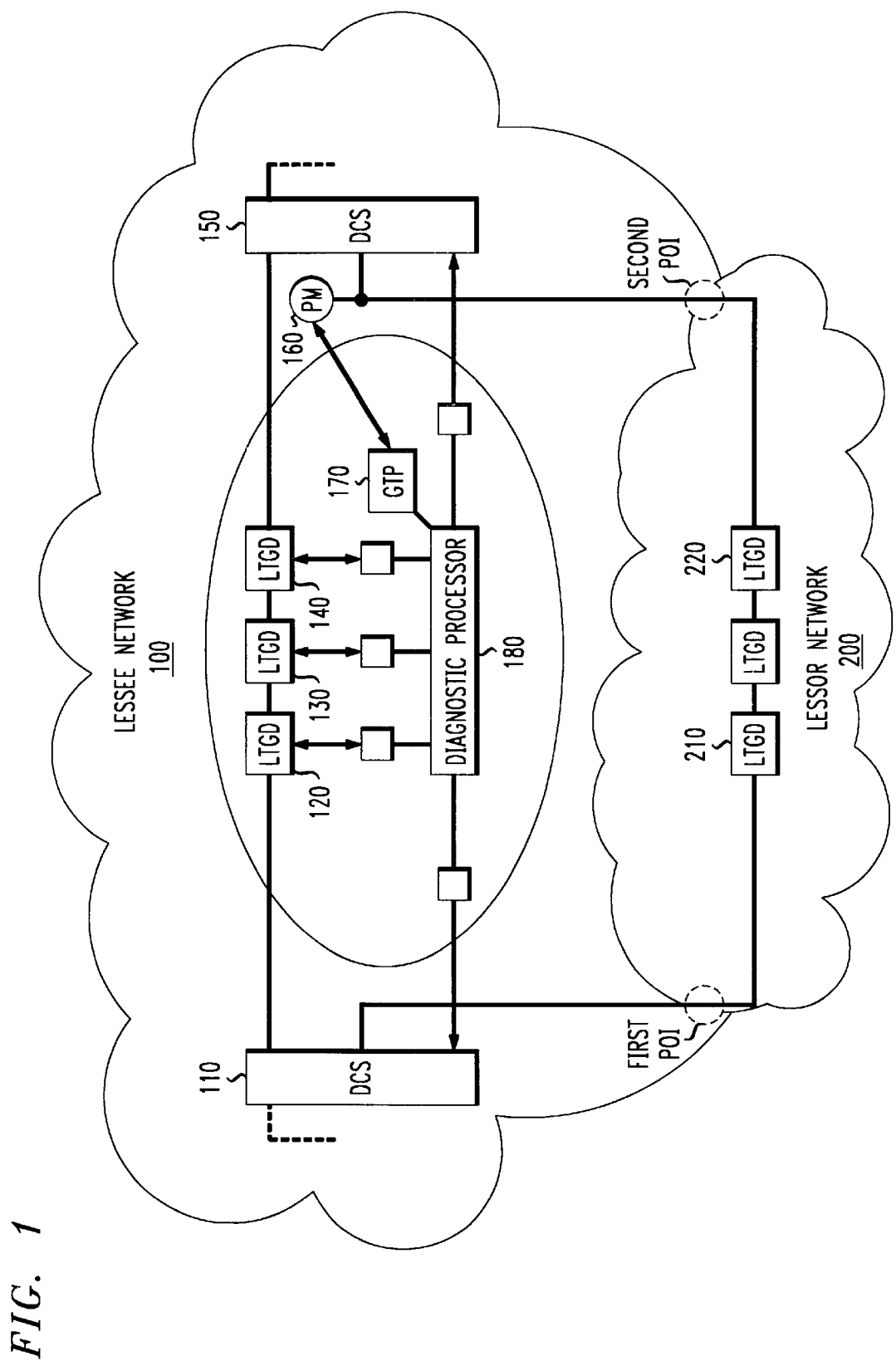
FIG. 1 is a block diagram of a lessee network and a lessor network according to the present invention.

FIG. 1 illustrates the interconnection of a lessee network 100 and a lessor network 200 as anticipated by the present invention. The lessee network 100 provides equipment that establishes high capacity communication pathways through the network. For example, the lessee network 100 provides digital cross connect switches ("DCS") that generate high speed digital multiplexed output. The digital data output from a first DCS 110 may traverse the path over one or more light guide routers ("LTGD") 120–140 to a second DCS 150. As is known, the first and second DCS 110, 150 may exchange data to or from the communication path with other communication equipment not shown to distribute the communication data between end customers (not shown).

The DCS and LTGD 110–150 carry high speed data. For example, the DCS 110 may output data as a 44.736 Mbit DS3 signal, carrying data capacity sufficient to carry 672 individual telephone calls. The LTGD 110–140 may multiplex up to 48 DS-3 signals onto a single optical trunk. The multiplexed output of the LTGD carries up to 2.2 gigabytes of data, enough to service more than 24,000 telephone calls.

In the anticipated lessor-lessee arrangement between the two networks, the networks 100, 200 are interconnected at first and second POIs. At the first POI, the first DCS 110 connects to first communication equipment 210 of the lessor network 200. Also, a second DCS 150 connects to second communication equipment 220 within the lessor network 200. In the lessor network 200, the first and second communication equipment 210, 220 route data from the first POI through a signal path to the second POI. The signal path may traverse intermediate communication equipment. The type of equipment provided by the lessor network 200 depends upon whether the lessor network provides a "clear" or "non-clear" path.

The present invention provides a performance monitor 160 that monitors data received by the lessee network 200 from the second POI. The performance monitor 160 is provided in communication with a diagnostic processor 180, typically via a general telemetry processor ("GTP") 170. Based upon data received from the second POI, the performance monitor 160 generates an alarm condition indicating that the signal path terminated within the lessor network 200.

By convention, when a trunk outbound from a DCS does not carry live data, the DCS generates an idle signal on the trunk. An ARW-7 DS3 PROTN SW pack, an ARW-3 DS3 PROTN SW pack or equivalent circuit within the first DCS 110 generates the idle signal. Two conventionally known idle signal formats are the C-bit parity idle signal and the M13 framed idle signal, generated respectively by the ARW-7 and ARW-3 circuits. Typically, the idle signal is a repeating bit pattern, such as "1100 1100 1100 . . . " Because the lessee network 100 typically holds the leased capacity as a backup resource, the first DCS 110 provides the idle signal to the lessor network 200 at the first POI when the leased capacity is unused. The performance monitor 160 looks for this idle signal to be returned from the lessor network 200 at the second POI.

The present invention anticipates two different leasing arrangements between the networks: In a first arrangement, the lessor network 200 remains at its discretion to route data according to its own protocols but agrees to maintain a "clear" communication path. A clear path does not traverse any equipment that could generate an independent idle signal, such as a DCS. Thus, the first and second communication equipment 210, 220 might be an LTGD. In a second arrangement, the lessor network 200 provides no guarantee that the communication path is clear; in other words, an independent idle signal could be generated within lessor network 200. The first and second communication equipment 210, 220 might be a DCS or an LTGD in the non-clear path. The performance monitor 160 operates in different modes depending upon whether it monitors clear paths or non-clear paths.

CLEAR PATHS

The lessor network 200 may be obligated to route the idle signal from the first POI to the second POI by the lessor network 200 through a clear path. A properly operating clear path is illustrated in FIG. 2(a). The performance monitor 160 retrieves signaling that has been returned by the lessor network at the second POI. The performance monitor 160 checks the returned signal to determine if it contains the idle signal. If the idle signal is detected, the performance monitor 160 generates a status signal that indicates no failure is detected.

If the idle signal is not detected, the performance monitor 160 generates an alarm condition indicating a failure within the lessor network 200. The alarm condition is detected by the diagnostic processor 180. In response to the alarm condition, the diagnostic processor 180 fails the lessor's network as a backup resource.

When the performance monitor 160 detects the loss of the idle signal, the performance monitor 160 may determine that the loss occurred from equipment failure in the lessor network, as illustrated in FIG. 2(b). Typically, when routing equipment such as MUX 230 fails, later equipment in the communication path generates an alarm indicate signal ("AIS" or "blue signal"). The AIS signal is a second predetermined bit pattern such as "1010 1010 1010 . . . " In the illustration of FIG. 2(b), MUX 240 generates the AIS signal. The performance monitor 160 recognizes the AIS signal as indicating an equipment failure within the lessor network 200. Upon receipt of the AIS signal, the diagnostic processor 180 may confirm the operating status of the first DCS 110. If the diagnostic processor 180 confirms that the first DCS 110 is operating properly, the diagnostic processor determines that the equipment failure occurred in the lessor network 200.

Additionally, the performance monitor 160 also detects when live data is communicated from the lessor network 200 to the second DCS 150 in the lessee network 100. In this event, the performance monitor 160 generates an alarm condition indicating that the leased facility is in use. When detected by the diagnostic processor 180, the processor removes the leased capacity from consideration as a backup resource.

Regardless of the reason, when the diagnostic processor 180 determines that the idle signal is lost, the diagnostic processor 180 removes the leased capacity from consideration as a backup resource for emergency rerouting by the lessee network. For example, the leased capacity would not be available to the assignee's FASTAR® system for rerouting. An error message may be stored by the diagnostic processor 180 to audit the performance of the lessor network 200 in maintaining the leased facilities.

Figure 3:
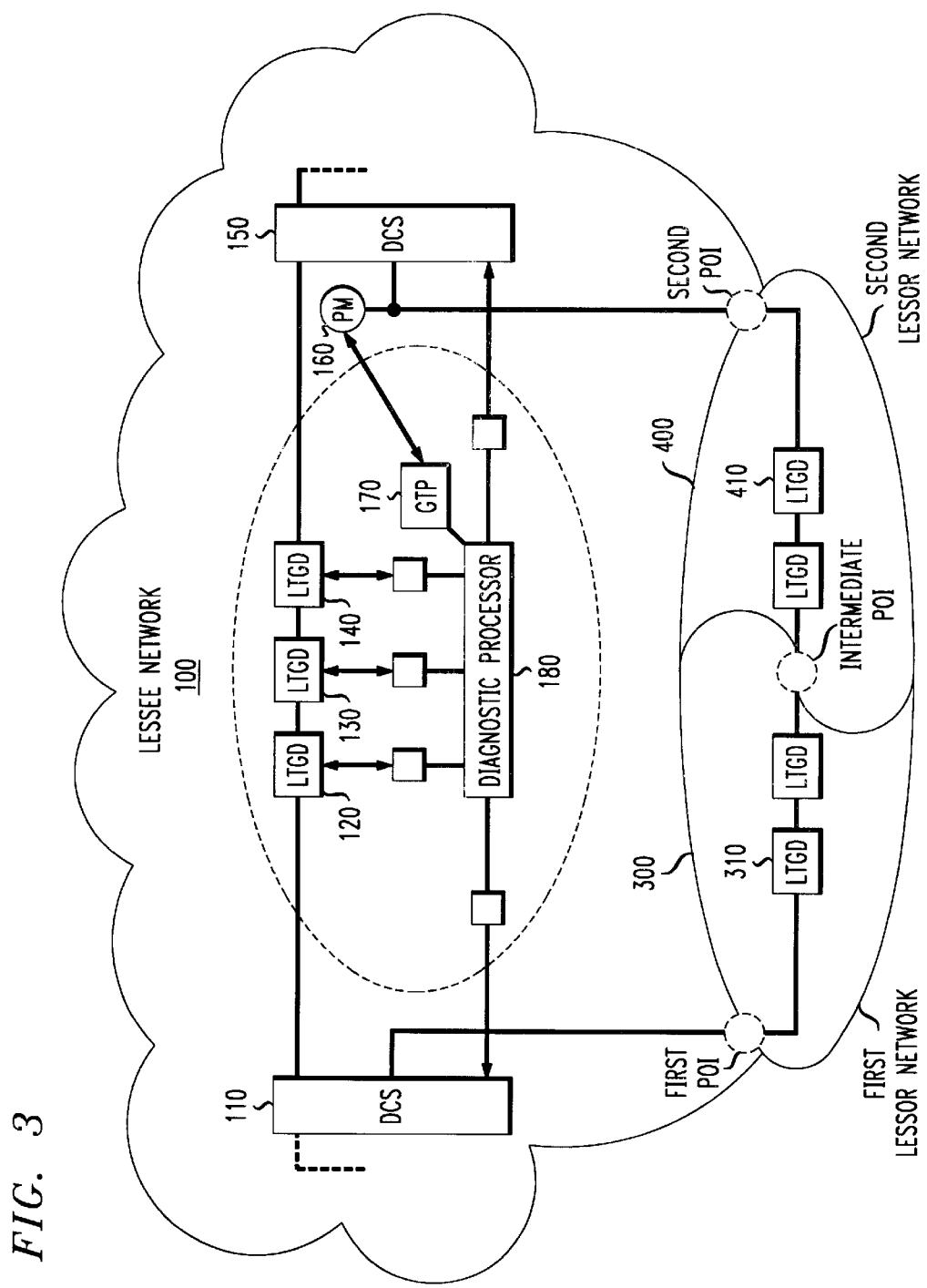
FIG. 3 is a block diagram of a lessee network and two lessor networks according to the present invention.

The "lessor network," in fact, may be a plurality of individual communication networks. Proprietors of a lessee network may contract with proprietors of more than one communication network to lease capacity. Leased capacity might progress as illustrated in FIG. 3. In this instance, the first DCS 110 interfaces with communication equipment 310. of a first lessor network 300 at the first POI. The second DCS 150 interfaces with communication equipment 410 of a second lessor network 400 at the second POI. The first and second lessor networks 300, 400 route data from the first POI to the second POI. To interconnect, the first and second lessor networks exchange the data at some intermediate point of interface between the networks. Indeed, more than two networks may cooperate to provide leased capacity to a lessee network 100.

In the multi-lessor embodiment such as that shown in FIG. 3, the performance monitor 160 operates exactly as described above with respect to the single lessor embodiment of FIGS. 2(a)–2(b). However, a detection of equipment failure does not permit the diagnostic processor 180 to identify which of the lessor networks 300, 400 suffers the equipment failure.

Figure 2C:
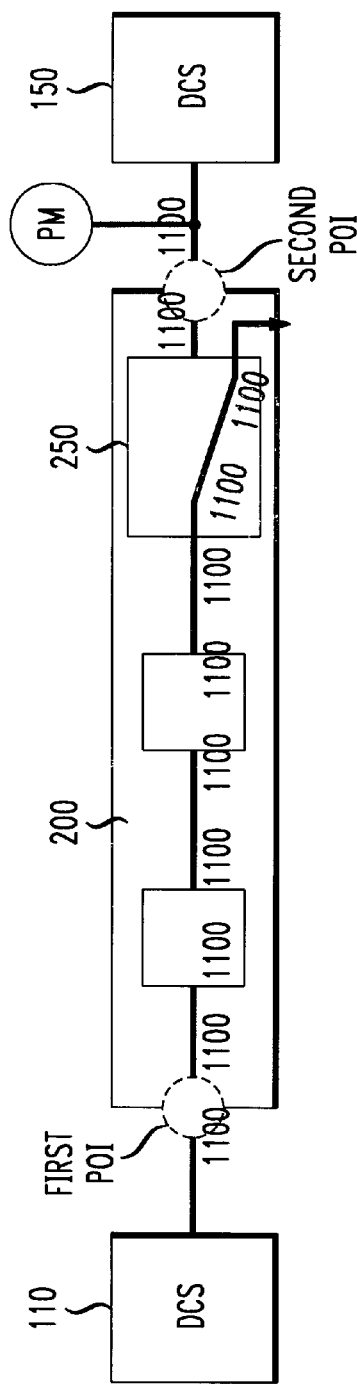

As discussed, a clear path is one that traverses no equipment that could generate a false idle signal. Where the lessee network 100 provides DS3 signals to the lessor network 200, the communication path in the lessor network 200 should traverse no other DCS switches. A non-clear channel, one that contains a DCS switch 250 in the lessor network 200 is shown in FIG. 2(c). The lessor's DCS 250 may generate an idle signal in the path when live data is removed from an input to the DCS 250. The idle signal is a "false" idle because it indicates that the leased facility is a viable communication path when in fact it is not.

Figure 2D:
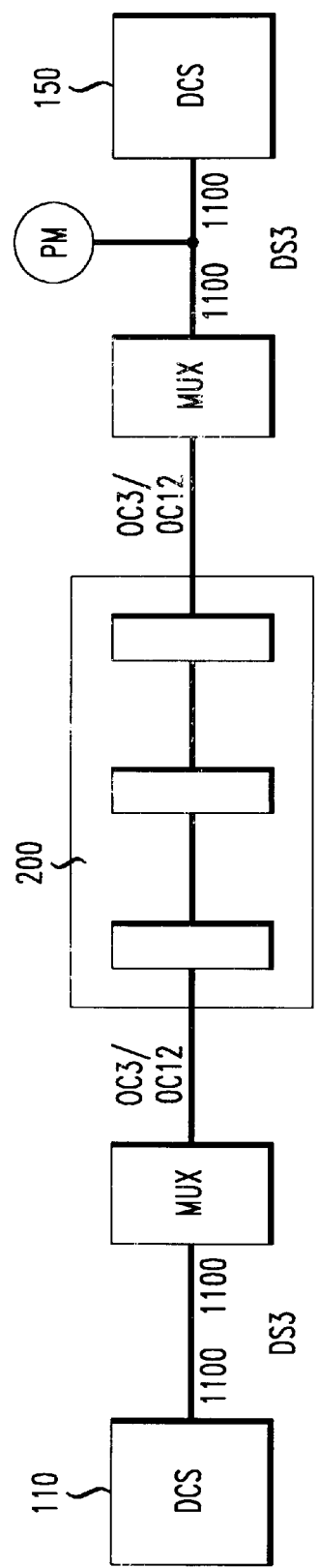

The lessee network 100 may multiplex the idle signal from the first DCS 110 with other signals and present an optical signal to the lessor network 200 at the first POI. For example, consider the embodiment shown in FIG. 2(d), where the DS3 idle signal is multiplexed to one of the known OC3 or OC12 optical signaling protocols. Such multiplexing generates overhead bits that represent, in part, the idle signal of the first DCS 110. While within the lessor's network, the optical signals must not traverse any OC3 or OC12 to STS-1 demultiplexing/multiplexing devices. In this way, the overhead bits travel unchanged through the lessor network 200. Once back in the lessee's network 100, the DS3 idle signal may be demultiplexed from the optical signal and input to the second DCS 150. Thus, the performance monitor 160 may monitor the idle signal to determine whether the leased path is viable.

NON-CLEAR PATH

In the clear path embodiment, the lessee network 100 obtains a guarantee that the lessor network 200 will not establish a signal path for the leased capacity that traverses equipment that could generate an independent idle signal such as a DCS. Non-clear paths do not provide this guarantee. As described above with respect to FIG. 2(c), equipment failures in a non-clear path may give rise to false idle signals being generated by DCS 250 equipment in a lessor network 200.

The performance monitor 160 may be programmed to detect false idle signals in the data returned from the lessor network 200. The communication networks transmit data in time slots on an optical cable. To detect the false idle, the performance monitor 160 monitors every time slot to detect the false idle. The time slots will exhibit a short interruption in the idle signal as the DCS 250 deallocates the signal path in the lessor network 200 then generates the false idle signal. Thus, the performance monitor 160 detects the presence of the (true) idle signal, a short interruption in the idle signal and, finally, a resumption of the (now, false) idle signal. In response, the performance monitor 160 indicates an alarm event.

The method of detection in the non-clear mode may be employed even on paths that should be clear. The non-clear mode provides an independent audit of the communication path to determine whether the lessor network provides a truly clear path.

Figure 4:
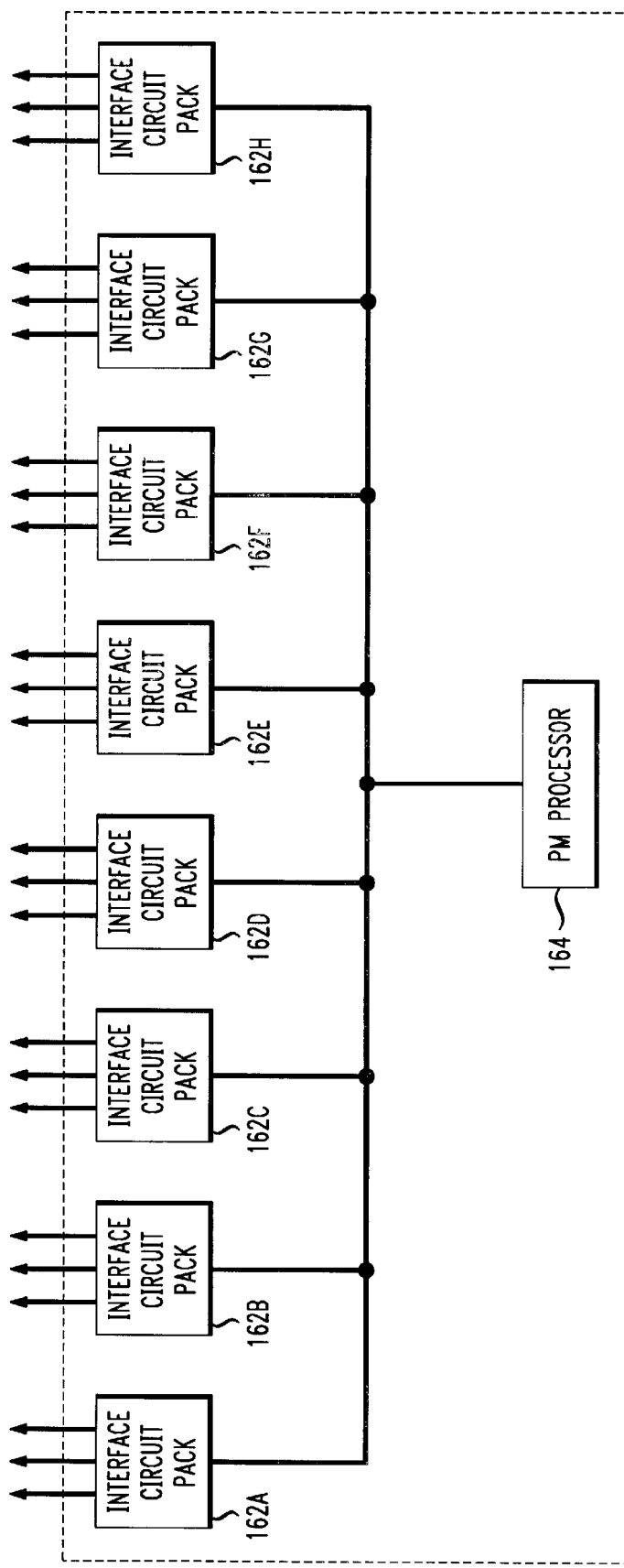
FIG. 4 is a block diagram of a performance monitor.

FIG. 4 illustrates an embodiment of the performance monitor 160. The performance monitor 160 is known. It is a shelf of equipment that monitors the performance of up to twenty-four DS3 (44.736 Mb/s) lines of M13 type and C-Bit Parity framing format. It provides alarm/status and performance information to a diagnostic processor 180 via the GTP 170.

The performance monitor 160 includes up to eight interface circuit packs 162A–H, each of which may monitor up to three DS3 lines (not shown). An interface circuit pack 162A bridges to the DS3 lines at the DSX-3 monitor level. The interface circuit packs 162A–H communicate with a performance monitor processor 164. The interface circuit packs 162A–H generate raw data which is gathered by the performance monitor processor 164.

The performance monitor processor 164 collects the raw data from the interface circuit packs 162A–H and accumulates it into alarm/status and performance monitoring registers. The performance monitor processor 164 communicates the alarm/status and performance monitoring information to the GTP 170 using the known Telemetry Asynchronous Block Serial ("TABS") protocol.

The performance monitor also may be a DS3 PM performance monitor, formerly manufactured by AT&T Network Systems of Ireland.

The present invention has been described with regard to monitoring integrity of DS3 leased facilities. Measuring idle signals of DS3 channels is particularly appropriate because typical errors associated with leased facilities may arise on a DS3 basis. That is, even if the lessee network leases an OC12 channel, which carries capacity sufficient to hold twelve DS3 channels, an error could arise that affects only one of the twelve DS3 channels therein. However, it should be understood that the scope of the present invention is limited in no way to DS3 facilities. Indeed, the principles of the present invention may be applied to an entire OC hierarchy (STS1, OC3, OC12, OC24 or OC48, etc.) or any other signaling protocol that may be desired.

We claim:

1. In a first communication network, a method of verifying integrity of communications facilities leased from a second communication network, comprising the steps of:
    generating an idle signal in the first network, said idle signal indicating that the communications facilities are available for user data,
    forwarding the idle signal to a first interface point of the second network,
    detecting at a second interface point of the second network a signal returned to the first network from the second network,
    determining whether the idle signal is contained in the returned signal, and
    when the idle signal is not contained in the returned signal, generating an alarm condition.

2. The method of claim 1, further comprising a step of communicating the alarm condition to a diagnostic center of the communication network.

3. The method of claim 2, further comprising a step of, upon detection of the alarm condition at the diagnostic center, disqualifying the leased facility as a viable resource of the first communication network.

4. The method of claim 1, wherein the alarm condition indicates a loss of integrity.

5. The method of claim 1, further comprising steps of, when the idle signal is not present in the returned signal:
    determining whether the returned signal contains an alarm indicate signal,
    when the returned signal contains the alarm indicate signal, generating an alarm condition representing an equipment failure in the lessor network.

6. In a first communication network, a method of verifying integrity of communication facilities leased from at least one lessor network, comprising the steps of:
    generating in the first network an idle signal, said idle signal indicating that the leased facilities are available for user data,
    forwarding the idle signal to a first interface point of the leased facilities,
    detecting at a second interface point of the leased facilities a signal returned to the first network from the leased facilities, determining whether the idle signal is contained in the returned signal, and generating an alarm condition unless the idle signal is contained in the returned signal.

7. The method of claim 6, further comprising a step of communicating the alarm condition to a diagnostic center of the communication network.

8. The method of claim 7, further comprising a step of, upon detection of the alarm condition at the diagnostic center, disqualifying the leased facility as a viable resource of the first communication network.

9. The method of claim 6, wherein the alarm condition indicates a loss of integrity.

10. The method of claim 6, further comprising steps of, when the idle signal is not present in the returned signal:

determining whether the returned signal contains an alarm indicate signal, when the returned signal contains the alarm indicate signal, generating an alarm condition representing an equipment failure in the lessor network.

11. In a communication network, a method of verifying integrity of communication facilities leased from at least one lessor network, comprising the steps of:

generating in the first network a continuous idle signal, forwarding the idle signal to the at least one lessor network at a first point of interface, detecting a signal from a second point of interface returned to the first network from the at least one lessor network, determining whether the idle signal is contained in the returned signal, when the idle signal is found in the returned signal but momentarily disappears from the returned signal, generating an alarm event that represents a false idle condition.

12. In a first communication network, a method of verifying integrity of communications facilities leased from a lessor communication network, comprising the steps of:

generating a continuous idle signal in the first network, said idle signal indicating that the leased facilities are available for user data, forwarding the idle signal to a first interface point of the leased facilities, detecting at a second interface point of the leased facilities a signal returned to the first network from the leased facilities, determining whether the idle signal is contained in the returned signal, and when the idle signal is not contained in the returned signal, generating an alarm condition.

* * * * *

UNITED STATES PATENT AND TRADEMARK OFFICE
CERTIFICATE OF CORRECTION

PATENT NO. : 6,351,768 B1
DATED : February 26, 2002
INVENTOR(S) : Raymond E. Alldread, William T. Murphy, Luiz A. Vitoria, Terry Watkins and Joseph Wittmann It is certified that error appears in the above-identified patent and that said Letters Patent is hereby corrected as shown below:

Column 6,
Line 46, the words -- second network -- rather than "the leased facility" should follow the word "disqualifying";
Line 56, the word -- second -- rather than the word "lessor" should precede the word "network".

Column 7,
Line 22, the word -- first -- should be inserted after "a".

Column 8,
Lines 1-2, the words "from a second point of interface" should be deleted;
Lines 2-3, the words -- at a second point of interface -- should be inserted after the second occurrence of the word "network".

Signed and Sealed this

Twenty-second Day of October, 2002

Attest:

JAMES E. ROGAN
Attesting Officer
Director of the United States Patent and Trademark Office